United States Patent
Brieda et al.

(10) Patent No.: US 8,633,652 B2
(45) Date of Patent: Jan. 21, 2014

(54) TEMPERATURE-STABILIZED CURRENT REGULATION DRIVER

(75) Inventors: Alessandro Brieda, Sacile (IT); Matteo Toscan, Maser (IT)

(73) Assignee: OSRAM GmbH, Munich (DE)

( * ) Notice: Subject to any disclaimer, the term of this patent is extended or adjusted under 35 U.S.C. 154(b) by 503 days.

(21) Appl. No.: 12/770,933

(22) Filed: Apr. 30, 2010

(65) Prior Publication Data

US 2010/0277091 A1    Nov. 4, 2010

(30) Foreign Application Priority Data

May 4, 2009    (IT) .............................. TO2009A0358

(51) Int. Cl.
*H05B 37/02*    (2006.01)

(52) U.S. Cl.
USPC ...... 315/224; 315/291; 315/209 T; 315/209 R

(58) Field of Classification Search
USPC .......... 315/185 R, 186, 193, 209 R, 210, 224, 315/226, 209 T, 291, 294, 299, 300, 301, 315/302, 307, 311, 312, 313, 320, 361, 362
See application file for complete search history.

(56) References Cited

U.S. PATENT DOCUMENTS

| | | |
|---|---|---|
| 2005/0029527 A1 | 2/2005 | Yamamoto et al. |
| 2005/0057236 A1 | 3/2005 | Telecco et al. |
| 2005/0179493 A1 * | 8/2005 | Yang et al. .................... 330/254 |
| 2006/0002154 A1 | 1/2006 | Amrani et al. |
| 2006/0076901 A1 | 4/2006 | Lin |

FOREIGN PATENT DOCUMENTS

| | | |
|---|---|---|
| CN | 1839360 A | 9/2006 |
| CN | 101010650 A | 8/2007 |
| CN | 101032188 A | 9/2007 |
| WO | 2006019897 A2 | 2/2006 |

OTHER PUBLICATIONS

Search Report of the corresponding Italian patent application No. ITT020090358, Aug. 27, 2010.
English Abstract CN101032188 A. Sep. 5, 2007.

* cited by examiner

*Primary Examiner* — Douglas W Owens
*Assistant Examiner* — Jianzi Chen

(57) ABSTRACT

A driver device may include a driver transistor providing a regulated current; and a stabilization circuit to produce a stabilized reference voltage to be applied to said driver transistor. The stabilization circuit may include: first and second bipolar stabilization transistors; a voltage divider including a first resistance and a second resistance, said voltage divider being interposed between the bases of said first and said second transistors, with the first resistor connected between the base of said second transistor and said partition point of said voltage divider and the partition point acting on the base of the first transistor; and a polarization network to determine the base-emitter voltages of said first and said second stabilization transistors, wherein: said first resistance has a value lower than the value of said second resistance, and the base-emitter voltage of said first transistor is higher than the base-emitter voltage of said second transistor.

20 Claims, 2 Drawing Sheets

TEMPERATURE-STABILIZED CURRENT REGULATION DRIVER

CROSS-REFERENCE TO RELATED APPLICATION

This application claims priority to Italian Patent Application Serial No. TO2009A000358, which was filed May 4, 2009, and is incorporated herein by reference in its entirety.

TECHNICAL FIELD

This disclosure relates to current regulation devices.

This disclosure was devised with specific attention paid to its possible application to the thermal stabilization of linear devices that regulate the driving current of light sources such as, for example, light emitting diodes (LEDs).

BACKGROUND

In backlighting applications, discharge lamps (or fluorescent lamps) have recently been increasingly substituted with LED lighting modules. Such lighting modules may comprise several printed circuit boards (PCBs), each of them with one or more LEDs, the PCBs being connected through wires or cables in order to be flexible and fit into channel letter light signs, that normally require custom light sources, or adaptable systems. The high number of units (or modules) connected in parallel requires a low cost driving solution.

The linear current regulation device according to the diagram of FIG. 1 is an example of a solution presently used for the purpose.

In this example, that refers to the driving of two LEDs connected in series and respectively indicated by LED1 and LED2, the device includes two bipolar transistors (BJT), in this case of a pnp type, indicated by the reference numbers T1 and T2, and two resistances R1 and R2.

Referring to FIG. 1, the positive terminal of a direct voltage input generator VDC1 is connected to the emitter E1 of the first transistor T1 (node A). The resistance R1 is connected between the emitter E1 and the base B1 of the first transistor T1. The emitter E2 of the second transistor T2 is connected (node C) to the base B1. The collector C1 of the first transistor T1 is connected, via the node D, to the base B2 of the second transistor T2. The resistance R2 is connected between the node D and the node B, i.e. the negative terminal of the voltage generator VDC1. The collector C2 of the second transistor T2 feeds the series of both LED1 and LED2. Finally, the cathode of the second diode LED2 is connected to the above mentioned node B on the second supply line 20.

In operation, the high-impedance resistance R2 polarizes the first transistor T1 with a very low collector current Ic (μA), but the base-emitter voltage $V_{BE1}$ of the first transistor T1 is set to the value $V_{BEon}$.

The current $I_{LED}$ that flows through and drives the LEDs is the same as the collector current $I_{C2}$ of the transistor T2 (which approximately equals the emitter current $I_{E2}$ of the same transistor) and therefore it is dependent, through the resistance R1, on the value of the voltage dropping between the emitter and the base (reference voltage $V_{BE1}$) of the transistor T1, according to the following relation:

$$I_{LED} = I_{C2} \approx I_{E2} = \frac{V_{BE1}}{R_1}$$

In the driver device of FIG. 1, the transistor T2 is therefore used as a driver circuit of the LEDs, while the transistor T1 has a stabilizing function.

The collector current $I_{C2}$ of the driver transistor T2 drives the light sources LED1 and LED 2 and the stabilization circuit T1, R1, R2 generates a reference voltage $V_{BE1}$—stable with reference to the input voltage VDC1—which, applied to the transistor T2, makes the current $I_{LED}$ flowing through the LEDs equally stable with reference to the input voltage VDC1. The consequence is a stabilization of the current $I_{LED}$ with reference to the input voltage VDC1.

Nevertheless, there remains a dependence of the current $I_{LED}$ from the usage temperature T (because of the thermal drifts of $V_{BE}$).

A possible range of the operating temperatures of LED modules goes from −30° C. to +80° C., because of the different ambient conditions where they can be employed.

The base-emitter junction voltage of the transistor T1 varies with the temperature T on the basis of a coefficient k (mV/° C.).

Considering the reference standard ambient temperature of 25° C., the current $I_{LED}$ that flows in the LEDs varies on the basis of the following relation:

$$I_{LED}(T) = \frac{V_{BE1}(T)}{R_1} = \frac{V_{BE1}(T0) + k \cdot \Delta T}{R_1} = \frac{V_{BE1}(T0) + k(T - T0)}{R_1}$$

$$= \frac{V_{BE1}(T0)}{R_1} + \frac{k(T - T0)}{R_1} = I_{LED}(T0) + \Delta I_{LED}(T)$$

The value of the current $I_{LED}(T)$ at a given temperature T is therefore given by the value of the current $I_{LED}(T0)$ flowing in the LEDs at the reference temperature of 25° C. with a variation $\Delta I_{LED}(T)$ (positive or negative) which depends on the temperature T.

We can define:

$$H1 = \frac{d}{dT}\left(\frac{I_{LED}(T)}{I_{LED}(T0)}\right) = \frac{k}{V_{BE1}}$$

A typical value for the coefficient k for a p-n junction is −2 mV/° C.

Let us assume a numerical example where:
$I_{LED}(25°\ C.) = 30\ mA$,
$V_{BE1}(25°\ C.) = 0.6V$,
$R_1 = 20\Omega$.

In this case, the current at a low temperature of −30° C. increases up to the value of:

$$I_{LED}(-30°\ C) = \frac{V_{BE1}(25°\ C)}{R_1} + \frac{k(-30 - 25)}{R_1}$$

$$= 30\text{mA} + \frac{-0.002(-30 - 25)}{20}\text{mA}$$

$$= 35.5\text{mA}$$

while at a high temperature of +80° C. the current decreases to a value of:

$$I_{LED}(80° \ C) = \frac{V_{BE1}(25° \ C)}{R_1} + \frac{k(80-25)}{R_1}$$
$$= 30\text{mA} + \frac{-0.002(80-25)}{20}\text{mA}$$
$$= 24.5\text{mA}$$

In conclusion, it can be stated that the current at a temperature of −30° C. amounts approximately to 118% of the current at ambient temperature ($I_{LED}$(−30° C.)=118% $I_{LED}$(25° C.)), while at a temperature of +80° C. it amounts approximately to 82% of the current at ambient temperature ($I_{LED}$(80° C.)=82% $I_{LED}$(25° C.)).

Consequently, the LED module input power could have a variation of ±20% from the rated input power at a reference ambient temperature of 25° C.

SUMMARY

In various embodiments, a driver device to produce a regulated current from an input voltage is provided. The driver device may include a driver transistor for providing said regulated current; and a stabilization circuit to produce, from said input voltage, a stabilized reference voltage to be applied to said driver transistor; wherein said stabilization circuit may include: a first bipolar stabilization transistor and a second bipolar stabilization transistor, the base-emitter voltage of said second stabilization transistor determining said stabilized reference voltage for said driver transistor; a voltage divider including a first resistance and a second resistance, said voltage divider being interposed between the bases of said first and said second stabilization transistors, with the first resistor connected between the base of said second stabilization transistor and said partition point of said voltage divider and the partition point acting on the base of the first stabilization transistor; and a polarization network to determine the base-emitter voltages of said first and said second stabilization transistors, wherein: said first resistance of said voltage divider has a value lower than the value of said second resistance of said voltage divider, and the base-emitter voltage of said first stabilization transistor is higher than the base-emitter voltage of said second stabilization transistor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word "exemplary" is used herein to mean "serving as an example, instance, or illustration". Any embodiment or design described herein as "exemplary" is not necessarily to be construed as preferred or advantageous over other embodiments or designs.

In view of the foregoing the need is felt for drivers for light sources, for example LEDs (Light Emitting Diodes), capable of performing a linear regulation of the current, while allowing to obtain a thermal stabilization of the current itself.

Various embodiments provide such a device.

The claims are an integral part of the teachings of the invention provided herein.

The headings provided herein are for convenience only and do not interpret the scope or meaning of the embodiments.

Figure 1:
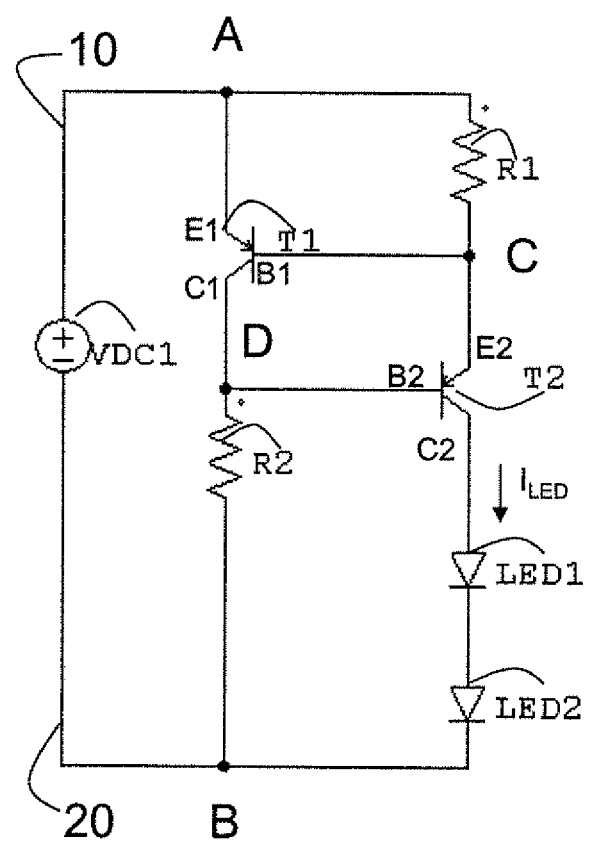
FIG. 1 has been described in the foregoing.
Figure 2:
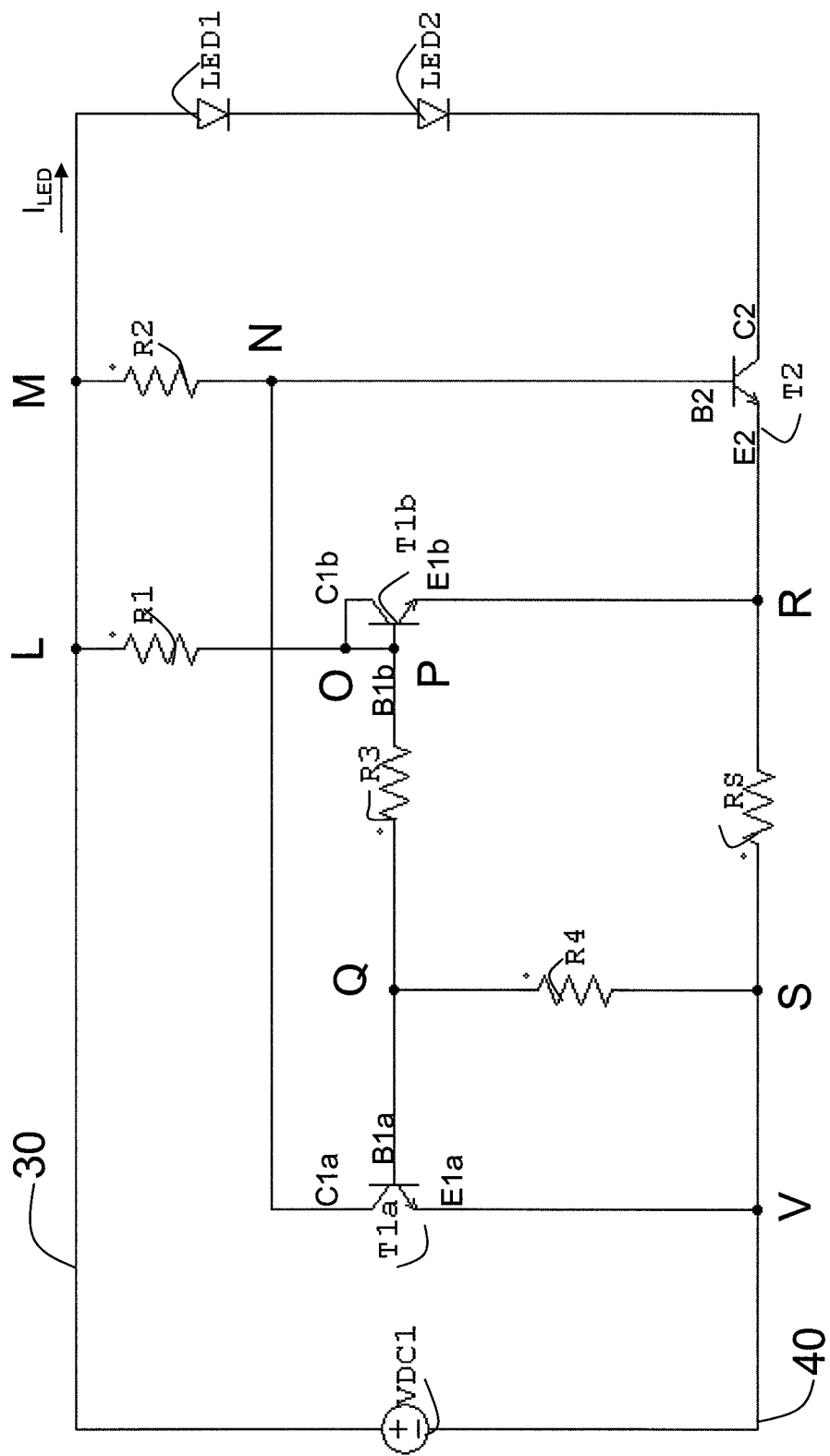
FIG. 2 shows a circuit diagram showing an embodiment of the solution described herein.

In FIG. 2 the parts, elements or components identical or equivalent to parts, elements or components already described with reference to FIG. 1 are indicated with the same reference numbers, which makes it unnecessary to repeat the related description.

Referring to FIG. 2, a linear current regulation driver is achieved using three bipolar transistors (BJT), respectively indicated with the references T1*a*, T1*b* and T2, here of the npn type, and five resistances (resistors) R1, R2, R3, R4 and RS.

In an embodiment, at least the transistor T2 can be a field effect transistor, such as a MOSFET. As a consequence, the terms "emitter", "base" and "collector", as used herein and referring to bipolar technology, are to be construed as throughout applicable (including the claims) to the terms "source", "gate" and "drain", which denote the corresponding elements of a FET.

As in the example shown in FIG. 1, in this case too the circuit is supposed to drive a load made up of a light source, comprising two diodes LED connected in series, indicated with LED1 and LED2.

Always referring to FIG. 1, to the positive terminal of the generator VDC1 a first input line 30 is connected, including the resistances R1 and R2, that serve primarily as polarization resistances of the transistors T1*a* and T1*b*, particularly (as will be detailed in the following) as regards the setting of the values of the respective base-emitter voltages.

Specifically, the resistance R1 is interposed between the supply line 30 (node L) and the collector C1*b* of the transistor T1*b*, while the resistance R2 is interposed between the supply line 30 (node M) and the collector C1*a* of the transistor T1*a*.

The transistor T1*b* has the base B1*b* and the collector C1*b* mutually connected (node O, that coincides with node P), so as to function essentially as a diode.

The resistances R3 and R4 form a voltage divider between the base B1*b* of the transistor T1*b* and the base B1*a* of the transistor T1*a*.

Specifically, the resistance R3 is interposed (as a "high" branch of the divider) between the bases B1a and B1b of the two transistors T1a and T1b, while the resistance R4 is interposed (as a "low" branch of the divider) between a node Q, arranged between the base B1a of the transistor T1a and the resistance R3, and a second supply line 40 leading to the negative terminal of the voltage generator VDC1 (node S).

The emitter E1a of the transistor T1a is connected to the second line 40 as well, via the node V.

As already stated, the resistance R2 is connected between the first supply line 30 (node M) and the node N, to which in turn the collector C1a of the transistor T1a and the base B2 of the transistor T2 are connected. The emitter E1b of the transistor T1b and the emitter E2 are mutually connected in a node R, to which also the resistance RS is connected, obtaining a function of amperometric resistor sensing the current flowing through the load, i.e. through the diodes LED1 and LED2 (for example to perform regulation functions that are not specifically considered herein). The resistance RS is connected between said node S and node R.

The two diodes LED1 and LED2 are connected in a series configuration and the anode of LED1 is connected to node M, while the cathode of LED2 is connected to collector C2 of the transistor T2; therefore, through the two LEDs a current flows that equals the collector current of the transistor T2.

In the regulator presently considered, the function of thermal stabilization makes use of the fact that the base-emitter voltage drop $V_{BE}$ of a bipolar transistor varies with the temperature T during use.

In the embodiment of FIG. 2, the resistance R2 sets the basic current for the transistor T2 ($I_{B2}$ is set on the basis of $\beta_{F2}$ and $I_{LED}$). Assuming, as it is correct to suppose, that the currents $I_{T1}$ and $I_{R4}$, that flow in the emitter of T1a and in the resistance R4, are negligible, the current in the load, i.e. in the LEDs, indicated as $I_{LED}$, is given by:

$$I_{LED} = \frac{V_{DC1} - V_{LED} - V_{CE2}}{R_S}$$

The value of the resistance R1 is chosen as to supply the transistor T1b with such a current as to establish, between base and emitter, a voltage $V_{BE1bON}$, which is the stable reference voltage of the circuit applied to the driver transistor T2.

When the transistor T1b is on, through the voltage divider made up by the resistances R3 and R4, the voltage $V_{BE1aON}$ between the base and the emitter of transistor T1a reaches the threshold voltage $V_{BE1a}$ and therefore T1a is switched on as well.

Once the transistor T1a is on, the current flowing through Rs, and which is equal to the current $I_{LED}$, is determined by the mesh stabilization given by R3, R4, $T_{1bon}$ and Rs. The voltage $T_{1bon}$ added to the voltage VRs, through the voltage divider made up by R3 and R4, must correspond to the voltage $T_{1aon}$ (which is the same as VR4). As both $T_{ion}$s are set through R1 and R2 and are stable, the voltage VRs stabilizes and, on the basis of the value of Rs, it is possible to set the needed current $I_{LED}$.

The stability condition is given by:

$$V_{BE1a} = (V_{BE1bON} + V_{RS}) \cdot \left(\frac{R_4}{R_3 + R_4}\right)$$

-continued $$= (V_{BE1bON} + I_{LED} \cdot R_S) \cdot \left(\frac{R_4}{R_3 + R_4}\right)$$

The electrical and thermal behaviour of the circuit can be improved making use of the fact that bipolar transistors such as the transistors T1a and T1b have the same thermal behaviour, e.g. as regards their base-emitter junction, so that their thermal drifts are compensated.

In an embodiment, this result is achieved by choosing the transistors T1a and T1b mutually identical. In an embodiment, T1a and T1b are on the same integrated component (and so both transistors are subjected to the same temperature). In an embodiment T1a and T1b are a pair of integrated monolithic components.

When the circuit is set as to obtain $V_{BE1a} = V_{BE1aON}$, the current of the LEDs is given by (assuming that $I_{RS} \approx I_{LED}$):

$$I_{LED}(T0) = \frac{V_{BE1aON}}{R_S} \cdot \left(\frac{R_3 + R_4}{R_4}\right) - \frac{V_{BE1bON}}{R_S}$$

Consequently, Rs is given by:

$$R_S = \frac{V_{BE1aON}}{I_{LED}(T_0)} \cdot \left(\frac{R_3 + R_4}{R_4}\right) - \frac{V_{BE1bON}}{I_{LED}(T_0)}$$

where $I_{LED}(T_0)$ is the target current for the LEDs, i.e. the desired current.

Once $V_{BE1bON}$ is set and $I_{LED}$ is fixed, the values of R3, R4 (and RS) may be chosen so as to minimize the current variation due to the thermal behaviour of the p-n junctions of T1a and T1b.

$$\Delta I_{LED} = \frac{\Delta V_{BE1aON}}{R_S} \cdot \left(\frac{R_3 + R_4}{R_4}\right) - \frac{\Delta V_{BE1bON}}{R_S}$$

In this case they have the same thermal coefficient, therefore:

$$\Delta V_{BE1a} = \Delta V_{BE1b} = k \cdot (T - T_0)$$

where typically k is –0.002 mV/K.
Thus:

$$\Delta I_{LED} = \frac{\Delta V_{BE1aON}}{R_S} \cdot \left(\frac{R_3 + R_4}{R_4} - 1\right)$$

$$= \frac{k \cdot (T - T_0)}{R_S} \cdot \left(\frac{R_3 + R_4}{R_4} - 1\right)$$

$$= \frac{k \cdot (T - T_0)}{R_S} \cdot \frac{R_3}{R_4}$$

and therefore:

$$I_{LED}(T) = I_{LED}(T_0) + \Delta I_{LED}(T)$$

$$= \frac{V_{BE1aON}}{R_S} \cdot \left(\frac{R_3 + R_4}{R_4}\right) - \frac{V_{BE1bON}}{R_S} + \frac{k \cdot (T - T_0)}{R_S} \cdot \frac{R_3}{R_4}$$

It is therefore possible to reduce the current variation generated by a temperature variation by choosing the suitable values for the resistances R3, R4 (and RS), and $$\frac{I_{LED}(T)}{I_{LED}(T0)} = 1 + \frac{k \cdot R_3 \cdot (T - T_0)}{V_{BE1aON} \cdot (R_3 + R_4) - V_{BE1bON} \cdot R_4}$$

Moreover, independently from temperature T, it is possible to define:

$$H2 = \frac{d}{dT}\left(\frac{I_{LED}(T)}{I_{LED}(T_0)}\right) = \frac{k \cdot R_3}{V_{BE1aON} \cdot (R_3 + R_4) - V_{BE1bON} \cdot R_4}$$

Depending on the values of $V_{BE1aON}$, $V_{BE1bON}$, R3 and R4, the denominator $V_{BE1aON} \cdot (R_3+R_4) - V_{BE1bON} \cdot R_4$ modifies the value of H2 in different ways.

In a first case, if $V_{BE1aON} \approx V_{BE1bON}$, then $$H2 = \frac{k \cdot R_3}{V_{BE1aON} \cdot (R_3 + R_4) - V_{BE1aON} \cdot R_4} \approx \frac{k}{V_{BE1aON}} = H1$$

and there would be no particular advantages in comparison with the standard solution.

In a second case, if $V_{BE1aON} < V_{BE1bON}$, then particular values of R3 and R4 can reduce almost to zero the denominator, and H2 can be extremely high.

For example, referring to an exemplary embodiment tested by the Applicant, the current variation $$\frac{I(T)}{I(T0)}$$

as a function of the voltage values $V_{BE1aON}$ was obtained with the following values: R3=0.5 kΩ; R4=10 kΩ and $V_{BE1aON} - V_{BE1bON} = -0.03V$.

By choosing R3=R4:

$$H2 = \frac{k \cdot R_3}{V_{BE1aON} \cdot (R_3 + R_4) - V_{BE1bON} \cdot R_3}$$
$$= \frac{k}{2V_{BE1aON} - V_{BE1aON}} \approx \frac{k}{V_{BE1aON}} = H1$$

because $V_{BE1aON} - V_{BE1bON} \ll V_{BE1aON}$.

In a third case, if $V_{BE1aON} > V_{BE1bON}$, the denominator is always positive, and therefore H2 can be reduced by choosing suitable values for the resistances R3 and R4.

The higher the voltage $V_{BE1aON}$ is in comparison to $V_{BE1bON}$, the lower H2 turns out to be (with the suitable resistances R3 and R4).

The condition $V_{BE1aON} > V_{BE1bON}$ represents the best solution in order to control the current variation $I_{LED}$ with reference to the temperature variation T, and it is obtained only modifying the values of the resistances R3 and R4.

In an embodiment tested by the Applicant, a current variation $I_{LED}$ (−30° C.) has been detected at a temperature of −30° C., as compared to the current $I_{LED}$ (25° C.) at ambient temperature in the case $V_{BE1aON}$ is 0.65 V, R4 is 10 kΩ₁ and $V_{BE1bON}$ is 0.62 V.

If a value of R3<1 kΩ was chosen, it was found that it is possible to keep the current value in a range of ±5% from the current value $I_{LED}$ (25° C.) at ambient temperature, in the complete range of operating temperatures.

Table 1 that follows summarizes, as a function of different values of the quantities considered in the foregoing, the data of current variation $I_{LED}$ as a function of temperature T.

TABLE 1

| | Values of the components | | | | |
|---|---|---|---|---|---|
| R1 | 10k | 30k | 30k | 30k | 47k |
| R2 | 10k | 10k | 10k | 10k | 10k |
| R3 | 1k | 1k | 4.7k | 0.56k | 1k |
| R4 | 10k | 10k | 4.7k | 10k | 10k |
| Ratio | 0.907063197 | 0.907063197 | 0.5 | 0.946969697 | 0.907063197 |
| $V_{BE1aON}$ | 0.597 | 0.629 | 0.622 | 0.628 | 0.622 |
| $V_{BE1bON}$ | 0.597 | 0.599 | 0.591 | 0.588 | 0.577 |
| $\Delta V_{BEON}$ | 0 | 0.03 | 0.031 | 0.04 | 0.045 |
| RS | 2.2 | 3.9 | 18 | 1.8 | 3.2 |

| T(° C.) | $I_{LED}$ A | $I_{LED}$ B | $I_{LED}$ C | $I_{LED}$ D | $I_{LED}$ E | Standard sol. |
|---|---|---|---|---|---|---|
| −30 | 32.85 | 26.15 | 41.68 | 37.84 | 35.5 | 37 |
| −15 | 31.6 | 25.72 | 40.01 | 37.45 | 35.12 | 35.5 |
| 0 | 30.29 | 25.26 | 38.2 | 37.12 | 34.68 | 33.9 |
| 15 | 28.9 | 24.77 | 36.4 | 36.7 | 34.25 | 32 |
| 25 | 27.97 | 24.41 | 35.24 | 36.5 | 34.02 | 31 |
| 30 | 27.5 | 24.25 | 34.56 | 36.3 | 33.85 | 30.5 |
| 35 | 27.03 | 24.07 | 33.96 | 36.13 | 33.69 | 30 |
| 40 | 26.55 | 23.89 | 33.47 | 35.84 | 33.53 | 29.37 |
| 45 | 26.07 | 23.72 | 32.88 | 35.7 | 33.38 | 28.74 |
| 60 | 24.62 | 23.19 | 31.18 | 35.43 | 32.94 | 27 |
| 80 | 22.66 | 22.46 | 28.75 | 35.23 | 32.66 | 25 |
| −30 | 117.4% | 107.1% | 118.3% | 103.7% | 104.4% | 119.35% |
| −15 | 113.0% | 105.4% | 113.5% | 102.6% | 103.2% | 114.52% |
| 0 | 108.3% | 103.5% | 108.4% | 101.7% | 101.9% | 109.35% |
| 15 | 103.3% | 101.5% | 103.3% | 100.5% | 100.7% | 103.23% |
| 25 | 100.0% | 100.0% | 100.0% | 100.0% | 100.0% | 100.00% |
| 30 | 98.3% | 99.3% | 98.1% | 99.5% | 99.5% | 98.39% |
| 35 | 96.6% | 98.6% | 96.4% | 99.0% | 99.0% | 96.77% |
| 40 | 94.9% | 97.9% | 95.0% | 98.2% | 98.6% | 94.74% |
| 45 | 93.2% | 97.2% | 93.3% | 97.8% | 98.1% | 92.71% |

TABLE 1-continued

| 60 | 88.0% | 95.0% | 88.5% | 97.1% | 96.8% | 87.10% |
| 80 | 81.0% | 92.0% | 81.6% | 96.5% | 96.0% | 80.65% |

In various embodiments, the upper part of the Table 1 shows the values of the components and the corresponding value of the ratio corresponding to (R4/(R3+R4)). The central and the lower parts of the Table show on the contrary the different current values through the LEDs for different temperatures, such values being shown both in their absolute value and as a percentage of the value at 25° C. In both cases, "standard sol." indicated the standard solution discussed in the introductory part of the description, with reference to FIG. 1.

The electrical and thermal measurements shown in Table 1 confirm the effectiveness of the described solution.

Specifically, it is possible to observe the following.

The first and the third column ($I_{LED}$ A and $I_{LED}$ C) show results without noteworthy advantages with reference to the standard solution, obtained in cases where:
  i) $V_{BE1aON}$ and $V_{BE1bON}$ are the same ($\Delta V_{BEON}=0$, first column), or
  ii) $V_{BE1aON}$ e $V_{BE1bON}$ are different from each other ($\Delta V_{BEON}=0.0031$) but R3 e R4 are the same (third column).

The second, the fourth and the fifth column ($I_{LED}$ B, $I_{LED}$ D and $I_{LED}$ E) show on the contrary results with remarkable advantages in comparison with the standard solution, which are obtained in cases where:
  i) $V_{BE1aON}>V_{BE1bON}$ ($\Delta V_{BEON}$ respectively=0.003; 0.004 and 0.0045); and
  ii) R3<R4.

In various embodiments, the comparison between the results in the second, fourth and fifth column ($I_{LED}$ B, $I_{LED}$ D e $I_{LED}$ E) shows that:
  with the same R3/R4 ratio (for example ⅒ for $I_{LED}$ B e $I_{LED}$ E) the performance improves as $\Delta V_{BEON}$ increases; and
  with substantially equal $\Delta V_{BEON}$ (see for example $I_{LED}$ D and $I_{LED}$ E) it is possible to obtain a further noteworthy improvement by further decreasing, to a value lower than ⅒, the R3/R4 ratio, i.e. by further reducing the partition ratio of the R3/R4 divider, and therefore increasing the coefficient named "ratio". The nearer to 1 the ratio tends to, the more effective the solution is, as it decreases the current variation in the allowable temperature range.

It is to be noted moreover that the value of the sensing resistance RS does not in itself take on a decisive role in achieving the results, even though such a resistance determines a voltage drop between the points R and S (and therefore V) that makes it possible to fulfil the condition $V_{BE1aON}>V_{BE1bON}$.

Without prejudice to the underlying principles of the invention, the details and the embodiments may vary, even appreciably, with respect to what has been described by way of example only, without departing from the scope of the invention as defined by the annexed claims. For example, it will be noted that, as mentioned in the foregoing, the presently described solution can be carried out in an embodiment in which at least the driver transistor T2 is a MOSFET and/or it can be used in general to obtain a current regulator with low drop-out for applications other than light source driving.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A driver device to produce a regulated current from an input voltage, the driver device comprising:
    a driver transistor for providing said regulated current; and
    a stabilization circuit to produce, from said input voltage, a stabilized reference voltage to be applied to said driver transistor;
    wherein said stabilization circuit comprises:
    a first bipolar stabilization transistor and a second bipolar stabilization transistor, the base-emitter voltage of said second stabilization transistor determining said stabilized reference voltage for said driver transistor;
    a voltage divider comprising a first resistance and a second resistance, said voltage divider being interposed between the bases of said first and said second stabilization transistors, with the first resistor connected between the base of said second stabilization transistor and said partition point of said voltage divider and the partition point acting on the base of the first stabilization transistor; and
    a polarization network to determine the base-emitter voltages of said first and said second stabilization transistors, wherein:
    said first resistance of said voltage divider has a value lower than the value of said second resistance of said voltage divider, and
    the base-emitter voltage of said first stabilization transistor is higher than the base-emitter voltage of said second stabilization transistor.

2. The device of claim 1,
wherein said first resistance of said voltage divider has a value equal to about ⅒ the value of said second resistance of said voltage divider.

3. The device of claim 1,
wherein said first resistance of said voltage divider has a value lower than ⅒ the value of said second resistance of said voltage divider.

4. The device of claim 1,
wherein said polarization network comprises respective resistances acting between said input voltage and the collectors of said first stabilization transistor and said second stabilization transistor.

5. The device of claim 1,
wherein said polarization network comprises a resistance acting between the emitters of said first stabilization transistor and said second stabilization transistor so as to cause a voltage drop between said emitters.

6. The device of claim 1,
wherein said second stabilization transistor is diode-connected with the collector connected to the base.

7. The device of claim 1,
wherein said first stabilization transistor and said second stabilization transistor are identical to each other.

8. The device of claim 1,
wherein said first stabilization transistor and said second stabilization transistor are mounted on a common support, so as to be subjected to the same temperature.

9. The device of claim 1,
wherein said first stabilization transistor and second stabilization transistor form a pair of monolithic integrated components.

10. The device of claim 1,
wherein said driver transistor is a bipolar transistor.

11. The device of claim 1,
wherein said driver transistor is coupled with a light source, such as a LED light source driven by said regulated current.

12. A driver device to produce a regulated current from an input voltage, the driver device comprising:
a driver transistor for providing said regulated current; and
a stabilization circuit to produce, from said input voltage, a stabilized reference voltage to be applied to said driver transistor;
wherein said stabilization circuit comprises:
a first field effect stabilization transistor and a second field effect stabilization transistor, the gate-source voltage of said second stabilization transistor determining said stabilized reference voltage for said driver transistor;
a voltage divider comprising a first resistance and a second resistance, said voltage divider being interposed between the bases of said first and said second stabilization transistors, with the first resistor connected between the gate of said second stabilization transistor and said partition point of said voltage divider and the partition point acting on the gate of the first stabilization transistor; and
a polarization network to determine the gate-source voltages of said first and said second stabilization transistors, wherein:
said first resistance of said voltage divider has a value lower than the value of said second resistance of said voltage divider, and
the gate-source voltage of said first stabilization transistor is higher than the gate-source voltage of said second stabilization transistor.

13. The device of claim 12,
wherein said first resistance of said voltage divider has a value equal to about 1/10 the value of said second resistance of said voltage divider.

14. The device of claim 12,
wherein said first resistance of said voltage divider has a value lower than 1/10 the value of said second resistance of said voltage divider.

15. The device of claim 12,
wherein said polarization network comprises respective resistances acting between said input voltage and the drains of said first stabilization transistor and said second stabilization transistor.

16. The device of claim 12,
wherein said polarization network comprises a resistance acting between the sources of said first stabilization transistor and said second stabilization transistor so as to cause a voltage drop between said sources.

17. The device of claim 12,
wherein said second stabilization transistor is diode-connected with the drain connected to the source.

18. The device of claim 12,
wherein said first stabilization transistor and said second stabilization transistor are mounted on a common support, so as to be subjected to the same temperature.

19. The device of claim 12,
wherein said driver transistor is a MOSFET transistor.

20. The device of claim 12,
wherein said driver transistor is coupled with a light source, such as a LED light source driven by said regulated current.

* * * * *